(12) United States Patent
Marciano (10) Patent No.: US 12,539,430 B2
(45) Date of Patent: Feb. 3, 2026

(54) METHOD AND APPARATUS FOR DETERMINING TRANSDUCER LOCATIONS TO GENERATE TUMOR TREATING FIELDS

(71) Applicant: Novocure GmbH, Root (CH)

(72) Inventor: Tal Marciano, Haifa (IL)

(73) Assignee: Novocure GmbH, Baar (CH)

( * ) Notice: Subject to any disclaimer, the term of this patent is extended or adjusted under 35 U.S.C. 154(b) by 378 days.

(21) Appl. No.: 17/555,026

(22) Filed: Dec. 17, 2021

(65) Prior Publication Data

US 2022/0203110 A1 Jun. 30, 2022

Related U.S. Application Data

(60) Provisional application No. 63/132,348, filed on Dec. 30, 2020, provisional application No. 63/132,361, filed on Dec. 30, 2020.

(51) Int. Cl.
*A61N 1/40* (2006.01)

(52) U.S. Cl.
CPC ..................... *A61N 1/40* (2013.01)

(58) Field of Classification Search
CPC .. A61N 1/40; A61B 5/053; A61B 2034/2053; A61B 2034/2072
See application file for complete search history.

(56) References Cited

U.S. PATENT DOCUMENTS 6,397,095 B1 5/2002 Eyuboglu et al.
7,565,205 B2 7/2009 Palti
2002/0038095 A1 3/2002 Tucker
2011/0288400 A1 11/2011 Russell et al.
2012/0209346 A1 8/2012 Bikson et al.
2018/0160933 A1* 6/2018 Urman .................. A61N 1/40
2020/0146586 A1 5/2020 Naveh et al.

FOREIGN PATENT DOCUMENTS

| JP | 2011-177590 A | 9/2011 | |
| JP | 2019-500179 | 1/2019 | |
| JP | 2020531082 A * | 11/2020 | ........... A61B 5/6804 |
| WO | WO-2005027720 A2 * | 3/2005 | ........... A61B 5/0205 |
| WO | 2005/115535 A2 | 12/2005 | |

\* cited by examiner

*Primary Examiner* — Carl H Layno
*Assistant Examiner* — Maria Catherine Anthony
(74) *Attorney, Agent, or Firm* — McCarter & English, LLP; Michael A. Sartori (57) ABSTRACT

A computer-implemented method of determining locations of transducers on a subject's body for applying tumor treating fields, the method including: selecting a plurality of pairs of locations on the subject's body, each pair of locations having a first location to locate a first transducer and a second location to locate a second transducer; obtaining, for each pair of locations, a voltage measurement and a current measurement for an electric field induced between the first transducer and the second transducer, the induced electric field passing through a tumor of the subject's body; calculating, for each pair of locations, a resistivity based on the voltage measurement and the current measurement; and selecting and outputting one or more recommended pairs of locations based on the calculated resistivities.

12 Claims, 6 Drawing Sheets

METHOD AND APPARATUS FOR DETERMINING TRANSDUCER LOCATIONS TO GENERATE TUMOR TREATING FIELDS

CROSS-REFERENCE TO RELATED APPLICATIONS

This application claims priority to U.S. Patent Application No. 63/132,348 filed Dec. 30, 2020 and U.S. Patent Application No. 63/132,361 filed Dec. 30, 2020, both of which are incorporated herein by reference.

BACKGROUND

Tumor treating fields (TTFields) are low intensity alternating electric fields within the intermediate frequency range, which may be used to treat tumors as described in U.S. Pat. No. 7,565,205. TTFields are induced non-invasively into the region of interest by applying AC voltages between transducers placed on the patient's body. Conventionally, a first pair of transducers and a second pair of transducers are placed on the subject's body. AC voltage is applied between the first pair of transducers for a first interval of time to generate an electric field with field lines generally running in the front-back direction. Then, AC voltage is applied between the second pair of transducers for a second interval of time to generate an electric field with field lines generally running in the right-left direction, and the system repeats this sequence.

SUMMARY OF THE INVENTION

One aspect of the invention is directed to a computer-implemented method of determining locations of transducers on a subject's body for applying TTFields. The method comprises: selecting a plurality of pairs of locations on the subject's body, each pair having a first location to locate a first transducer and a second location to locate a second transducer; obtaining, for each pair of locations, a voltage measurement and a current measurement for an electric field induced between the first transducer and the second transducer, the induced electric field passing through a tumor of the subject's body; calculating, for each pair of locations, a resistivity based on the voltage measurement and the current measurement; and selecting and outputting one or more recommended pairs of locations based on the calculated resistivities.

This aspect of the invention is exemplary, and other aspects and variations of the invention will be apparent from the following detailed description of embodiments.

DESCRIPTION OF EMBODIMENTS

To provide a subject with an effective TTFields treatment, precise locations at which to place the transducers on the subject's body must be generated based on, for example, the type, size, and/or location of the cancer in the subject's body. However, determining these locations often relies on time- and resource-intensive computer simulations. In addition, existing methods fail to account for physiological changes in the subject's body that can lead to directional variations over time. The inventor recognized these problems and discovered an approach to determine locations at which to place the transducers on the subject's body by incorporating actual current and voltage measurements of TTFields induced between transducers placed on the subject's body, which may improve the accuracy and efficiency of TTFields treatment.

Figure 1:
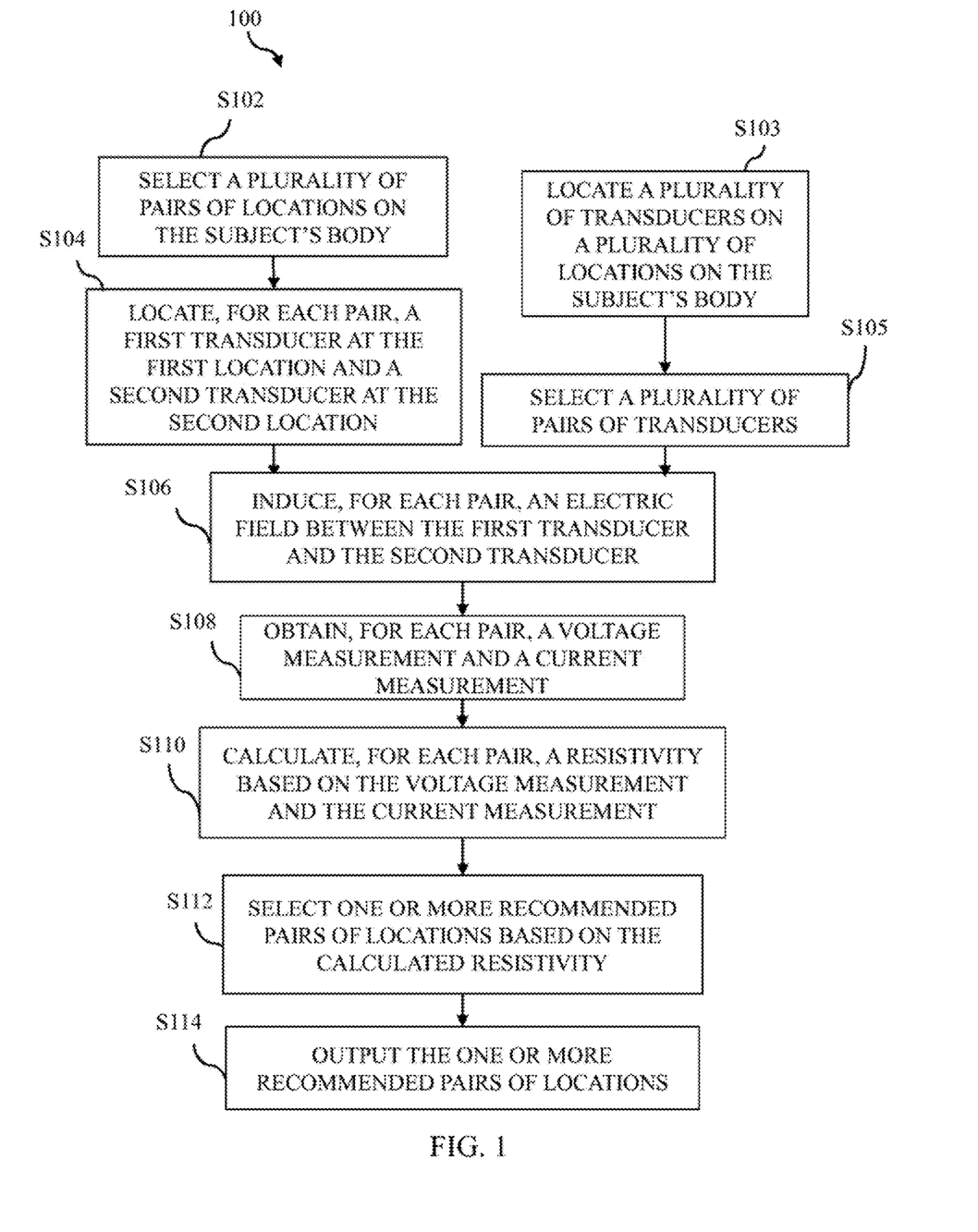
FIG. 1 is a flowchart depicting an example of determining transducer locations.

FIG. 1 depicts an example method 100 for determining locations of transducers on a subject's body for applying TTFields. Certain steps of the method 100 (and other methods below) are computer-implemented steps. The computer may be any device having one or more processors and memory accessible by the processor(s), the memory storing instructions that when executed by the processor(s) cause the computer to perform relevant steps of the method.

The method 100 may begin at step S102 with selecting a plurality of pairs of locations on the subject's body, each pair having a first location to locate a first transducer and a second location to locate a second transducer. At S104, the method 100 may comprise, for each pair, locating the first transducer at the first location and the second transducer at the second location.

In another example, the method 100 may begin at step S103 with a plurality of transducers being located on a plurality of locations on the subject's body. At step S105, the method 100 may comprise selecting a plurality pairs of transducers located on the plurality of locations of the subject's body, with each pair of transducers having one first transducer and one second transducer selected from the plurality of transducers.

After steps S102/S104 or steps S103/S105, the method 100 may proceed to step S106 where, for each location/transducer pair, an electric field (TTField) is induced between the pair of transducers and passes through a tumor in the subject's body. The TTField is produced by applying an AC voltage to at least part of the first transducer and at least part of the second transducer. At step S108, for each location/transducer pair, the method 100 comprises obtaining a voltage measurement and a current measurement associated with the induced TTField. Step S108 is a computer-implemented step in which current and voltage measurements that were obtained and/or recorded are received at a processing component. Current measurement(s) indicate a current of the TTField passing through a portion of the subject's body between the first and second transducers, and may comprise measurements of current at one or more electrodes in the transducers. Voltage measurement(s) indicate a voltage applied to the pair of transducers.

The current and voltage measurements may be generated and/or collected for the TTFields applied to the first transducer and the second transducer for a desirable time period prior to a real-time treatment of TTFields. The desirable time period for collecting the current and voltage measurements may be, for example, in seconds, minutes, hours, or days. An AC generator may monitor the current and voltage of the AC voltage applied to the first transducer and the second transducer and record the current and voltage measurements. In another example, one or more sensors separate from the AC generator may be used to detect the current and voltage of the TTFields and generate current and voltage measurements for recording.

The current and voltage measurements may be generated and collected in real-time or near real-time during a treatment time period in which TTFields are applied between the transducers (e.g., during in-vivo application of one or more TTFields to the subject's body). The current and voltage measurements of the TTFields may be recorded in a log file. The voltage and current measurements may be obtained at regular intervals throughout TTFields treatment.

Receiving or obtaining the current and voltage measurements may include receiving or accessing a log file in which the measurements are stored with a time stamp. This log file access may occur after TTFields treatment is complete. In another example, receiving the measurements may include receiving signals in real-time or near real-time via a communication interface (wired or wireless) between sensors detecting the current and/or voltage and the processing component (which may be next to, near to, close to, or far from the subject).

At step S110 (a computer-implemented step), for each location/transducer pair, the method 100 may comprise calculating a resistivity of the subject's body along a path of the TTField based on the received current and voltage measurements. The resistivity of the subject's body along the path of the TTField may be calculated by the following equation:

$$\rho = E/J \qquad \text{Equation 1}$$

Where $\rho$ is the resistivity in ohm meters ($\Omega$m); E is the electric field magnitude in volts/meter (V/m); and J is the current density magnitude of the TTField in amperes/square meter (A/m$^2$). The calculated resistivity may change over the time during a TTFields treatment, for example, as a result of physiological changes to the subject's body (e.g., sweating, hair growth, etc.), changes in the subject's body based on the subject's circadian rhythm, and/or changes in placement or attachment of the transducers (e.g., due to a conductive gel spreading, a garment moving, etc.).

At step S110, the method 100 may further comprise calculating a power density of the TTField between the first transducer and the second transducer based on the received current and voltage measurements. The power density of the TTField may be used to represent the TTField dose delivered to the tumor. The power density of the applied TTField between the first transducer and the second transducer may be calculated by the following equation:

$$P = \tfrac{1}{2} \sigma E^2 \qquad \text{Equation 2}$$

Where P is the power density of the applied TTField in Watts/volume (e.g., mW/cm$^3$); E is the magnitude of the electric field of the applied TTField, and $\sigma$ is the conductivity of the tissue:

$$\sigma = 1/\rho \qquad \text{Equation 3}$$

At step S112, the method 100 comprises selecting one or more recommended pairs of locations based on the calculated resistivity for each pair of locations at step S110. At step S114, the method 100 comprises outputting the one or more recommended pairs of locations based on the selected recommended pairs at step S112. Steps S112 and S114 are computer-implemented.

In one embodiment, step S112 may include comparing calculated resistivities for the plurality of pairs of locations, ranking the plurality of pairs of locations based on the calculated resistivities, and selecting a first pair of locations based on the ranking. In an example, the first pair of locations may have the lowest calculated resistivity in the plurality of pairs of locations. Step S112 may further comprise selecting a second pair of locations from the remaining one or more pairs of locations based on, for example, the selection of the first pair of locations.

The selection of the second pair of locations may be based on an intersection angle of the second pair of locations with respect to the first pair of locations. Each pair of locations may correspond to a line segment representing a distance between two locations and defined by, for example: a point on a first location to a point on a second location; an intersection with the first location and an intersection with the second location; pixels of the image; and/or voxels of the image. The intersection angle between the first line segment of the first pair of locations and the second line segment of the second pair of locations may be, for example, 90°, approximately 90°, substantially 90°, within a few degrees of 90, an angle based on physical geometry of the subject's body, or an angle based on the type of transducer to be used. In some cases, due to the subject's body and the location of the tumor, an intersection angle of 90° may not be possible, and in these cases, an intersection angle within 90°±20°, or within 90°±15°, may be used. The intersection angle of the intersecting line segment pairs may not intersect at 90° or close to 90° due to the location of the tumor and/or due to avoidance areas (e.g., eyes, ears, mouth, nipples, surgical scars, lesions, chemotherapy ports, etc.) precluding transducer placement thereon.

The selection of the second pair of locations may be based on a calculated resistivity of the second pair of locations. In an example, the second pair of locations has the second lowest resistivity in the plurality of pairs of locations. In another example, the second pair of locations has a lowest absolute value of a difference in resistivity with respect to the first pair of locations. The absolute value of the difference in resistivity between the first pair of locations and the second pair of locations ($\rho_{1-2}$) may be calculated by the following equation:

$$\rho_{1-2} = |\rho_1 - \rho_2| \qquad \text{Equation 4}$$

Where $\rho_1$ and $\rho_2$ are the calculated resistivities of the respective first and second location pairs.

Step S112 may further comprise calculating a difference in resistivity for a combination of two pairs of locations in the plurality of locations. The difference in resistivity ($\rho_{A-B}$) between any given two pairs of locations in the plurality pairs of locations, e.g., pair of locations A and pair of locations B, may be calculated by the following equation:

$$\rho_{A-B} = |\rho_A - \rho_B| \qquad \text{Equation 5}$$

Where $\rho_A$ is the calculated resistivity of the pair of locations A; and $\rho_B$ is the calculated resistivity of the pair of locations B. As such, step S112 may comprise comparing the absolute value of difference in resistivity between any given two pairs of locations in the plurality of locations, and selecting recommended combinations of two pairs of locations based on the calculated absolute value of difference in resistivity between the pairs of locations (e.g., selecting the two pairs of locations with the lowest absolute value of difference in resistivity).

Step S112 may further include calculating a local minimum power density (LMiPD) for a combination of two pairs of locations in the plurality of locations. LMiPD represents the lower of two power densities delivered by the TTFields to the tumor via two pairs of transducers. Power densities for the plurality of locations for delivering TTFields may be calculated, for example, using Equations 2 and 3 above. An ideal transducer layout may be obtained when LMiPD is maximized relative to other potential layouts. Step S112 may comprise selecting one or more recommended combinations of two pairs of locations based on the LMiPD of the two pairs of locations (e.g., selecting the two pairs of locations with the highest LMiPD).

The selection of the one or more recommended combination of two pairs of locations may satisfy two or more conditions discussed above. That is, the selection may be based on any desired combination of the intersection angle, the calculated resistivities, the absolute value of difference in resistivities, and/or LMiPD.

Figure 2:
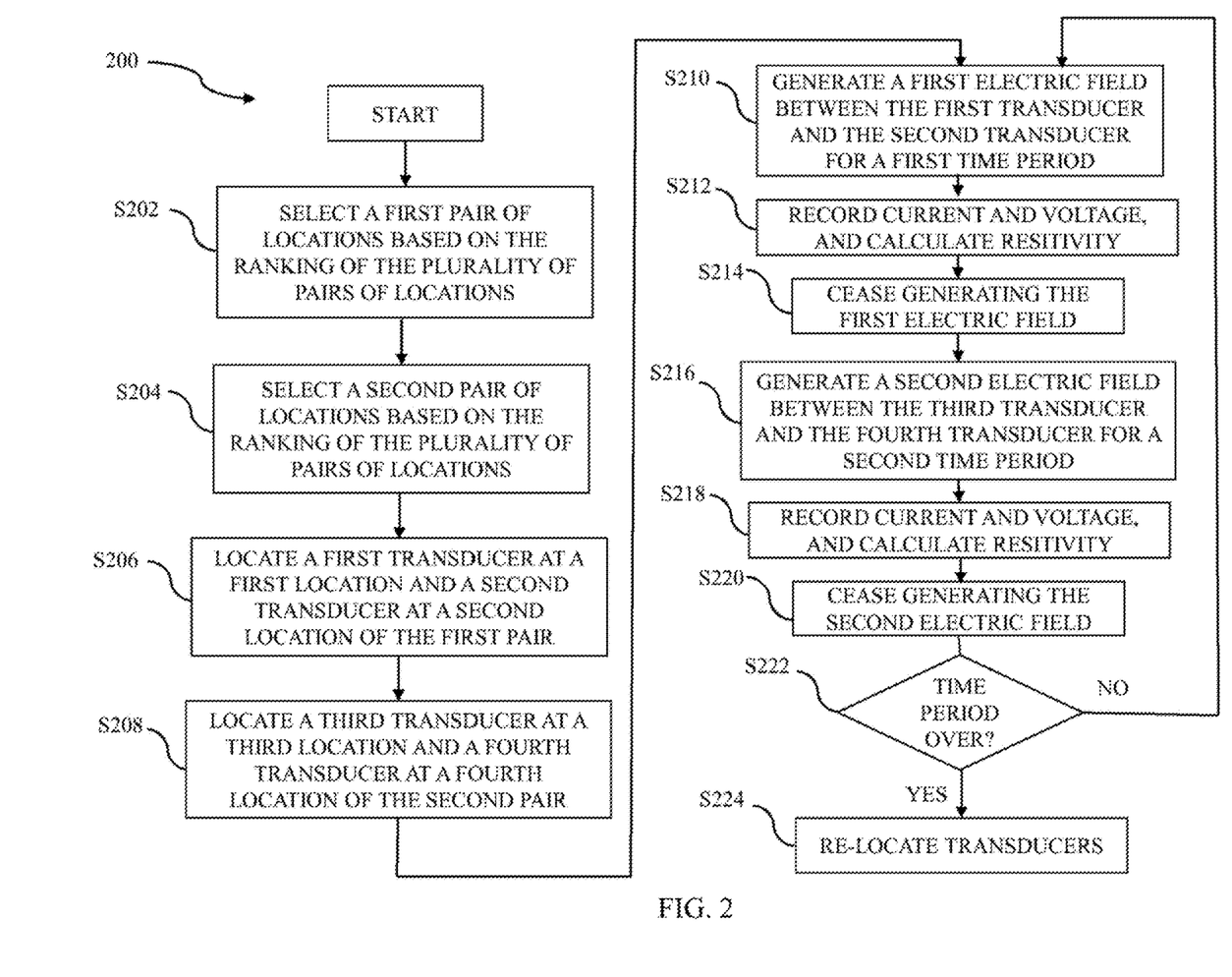
FIG. 2 is a flowchart depicting an example of applying TTFields to a subject's body.

FIG. 2 depicts a method 200 for applying TTFields that may follow after step S114 in FIG. 1. At step S202, a first pair of locations is selected (based on S112, e.g., based on a ranking of location pairs) for locating a first transducer and a second transducer. At step S204, a second pair of locations is similarly selected (based on S112) for locating a third transducer and a fourth transducer. At steps S206 and S208, first, second, third, and fourth transducers are located at the respective first, second, third, and fourth locations. At step S210, a first electric field is generated between the first transducer and the second transducer for a first time period (e.g., one second). At step S212, the current and voltage of the first electric field is measured and recorded, and the resistivity between the first transducer and the second transducer is calculated based on the current and voltage measurements. At step S214, after the first time period, the generation of the first electric field is ceased. At step S216, a second electric field is generated between the third transducer and the fourth transducer for a second time period (e.g., the same or different than the first time period). At step S218, the current and voltage of the second electric field is measured and recorded, and the resistivity between the third transducer and the fourth transducer is calculated based on the measurements. At S220, after the second time period, generation of the second electric field is ceased. At step S222, the method includes checking whether a third time period for determining when the transducers should be changed has passed. If the third time period is over, flow proceeds to step S224, in which the transducers are moved to new locations on the subject's body (e.g., based on S202/S204). If not, the process repeats steps S210-S220.

Figure 3A:
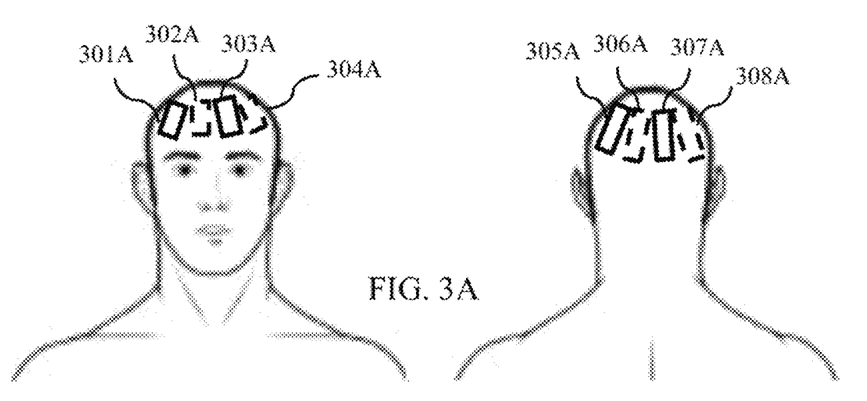
FIGS. 3A-3C depict examples of determining transducer locations on a subject's body.
Figure 3B:
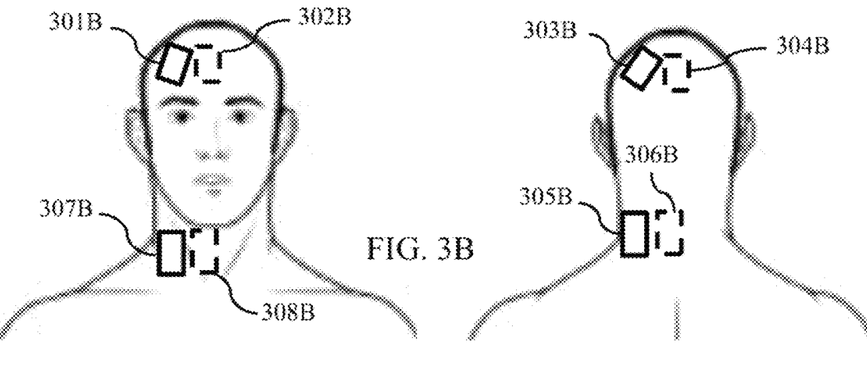
Figure 3C:
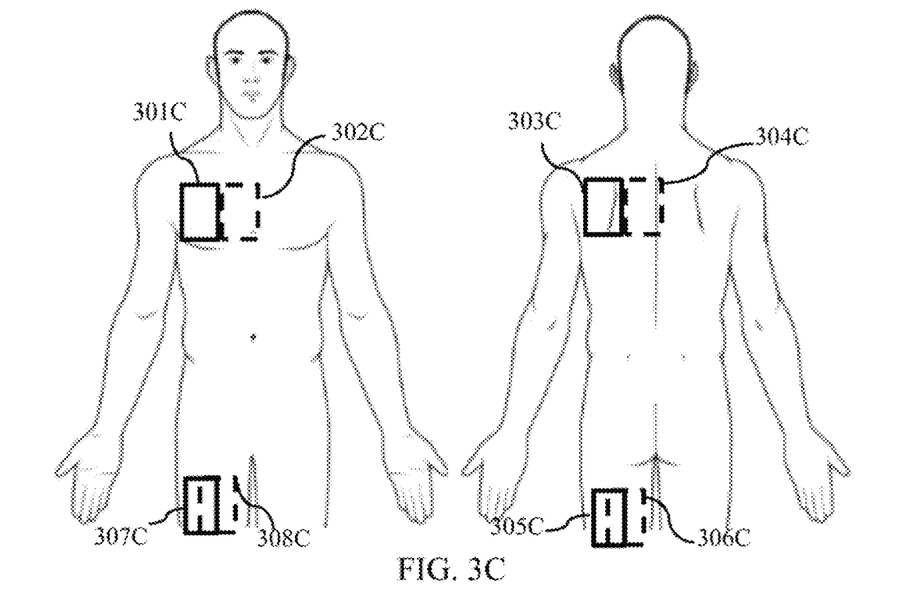

FIGS. 3A-3C depict example locations of transducers for placing transducer pairs on a subject's body. A plurality of locations (301A-C, 302A-C, 303A-C, 304A-C, 305A-C, 306A-C, 307A-C, 308A-C) may be selected: on the head of the subject's body (FIG. 3A); on the head and neck of the subject's body (FIG. 3B); or on or below a torso (thorax, thighs, etc.) of the subject's body (FIG. 3C). The plurality of locations may not overlap with one another (FIGS. 3A and 3B), two or more of the locations may partially overlap (e.g., 305C/306C and 307C/308C), or a first location may be the same for each of two location pairs. As shown, locations 301A-C/305A-C form a first pair of locations, and locations 303A-C/307A-C form a second pair of locations.

Figure 4:
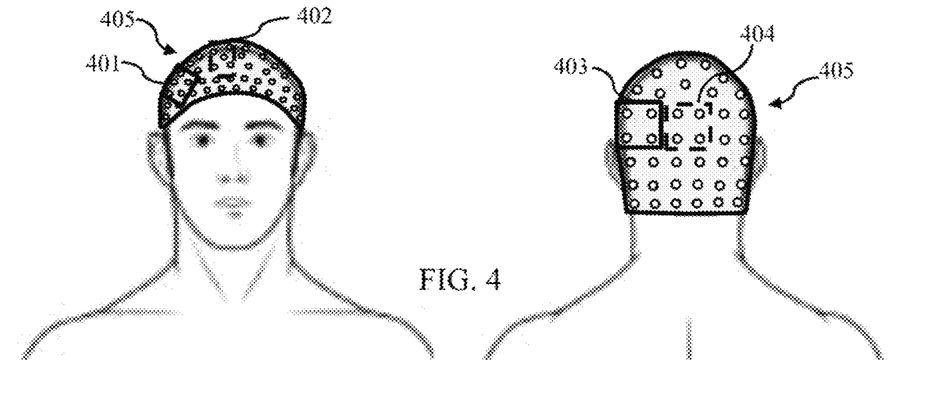
FIG. 4 depicts an example of determining transducer locations on a subject's body.

FIG. 4 depicts an example system for determining locations of transducers on a subject's body. In FIG. 4, a plurality of electrode elements is integrated in one transducer array 405. The transducer array 405 may be integrated into a helmet or a garment (e.g., a hat, a shirt, or pants). A plurality of pairs of transducers may be selected in the transducer array, where each pair of transducers includes one first transducer and one second transducer. Each transducer (e.g., transducers 401, 402, 403, 404) may include a plurality of electrode elements selected from the plurality of electrode elements in the transducer array 405. Transducers 401/403 may form a first pair of transducers, and transducers 402/404 may form a second pair of transducers.

Figure 5:
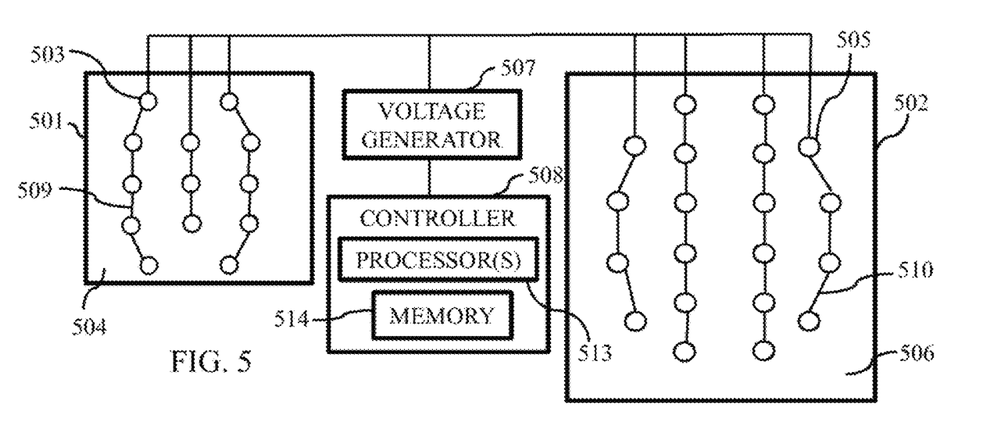
FIG. 5 depicts an example configuration of a pair of transducers.

FIG. 5 depicts an example configuration of one pair of transducers 501 and 502. Both transducers 501/502 may include substantially flat electrode elements 503/505 positioned on a substrate 504/506 and electrically and mechanically connected through conductive wiring 509/510. The substrate(s) 504/506 may include cloth, foam, flexible plastic, and/or conductive medical gel. In another example, one or more transducers may include electrode elements that are electrically and mechanically connected without a substrate. Transducers may be affixed to the subject's body or attached/incorporated in garment(s) covering the subject's body (e.g., a covering worn by the subject).

The transducers 501 and 502 may be connected to an AC voltage generator 507 and a controller 508, which may include a computer having one or more processors 513 and memory 514. The memory 514 may store instructions that when executed by the one or more processors control the AC voltage generator 507 to induce an electric field between the transducers 501 and 502 and/or cause the computer to perform one or more methods disclosed herein. The controller 508 may monitor operations performed by the voltage generator 507 (e.g., via the processor(s) 513) and store current and voltage values in memory 514. Other types of information (e.g., operational status, temperature values, etc.) may be collected as well. The current values, voltage values, and other types of information may be stored in a log file in the memory 514.

Figure 6:
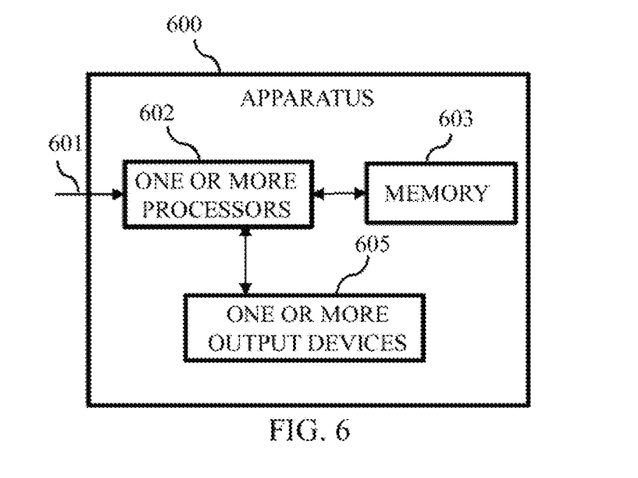
FIG. 6 depicts an example apparatus to determine transducer locations.

FIG. 6 depicts an exemplary apparatus 600 to determine locations of transducers for applying TTFields according to various embodiments herein. The apparatus 600 may include one or more processors 602, a memory 603, and one or more output devices 605. The apparatus 600 may be a computer. The apparatus 600 may be incorporated into, or may be separate from and communicatively coupled to, the controller 508 of FIG. 5. The memory 603 is accessible by the one or more processors 602, and the memory 603 may store instructions that, when executed by the processor(s) 602, cause the apparatus 600 to perform one or more methods disclosed herein. Based on current/voltage measurement feedback received as inputs 601, the processor(s) 602 may generate and/or rank a plurality of locations for the transducers, and output one or more location recommendations to a user on the output device(s) 605.

Figure 7:
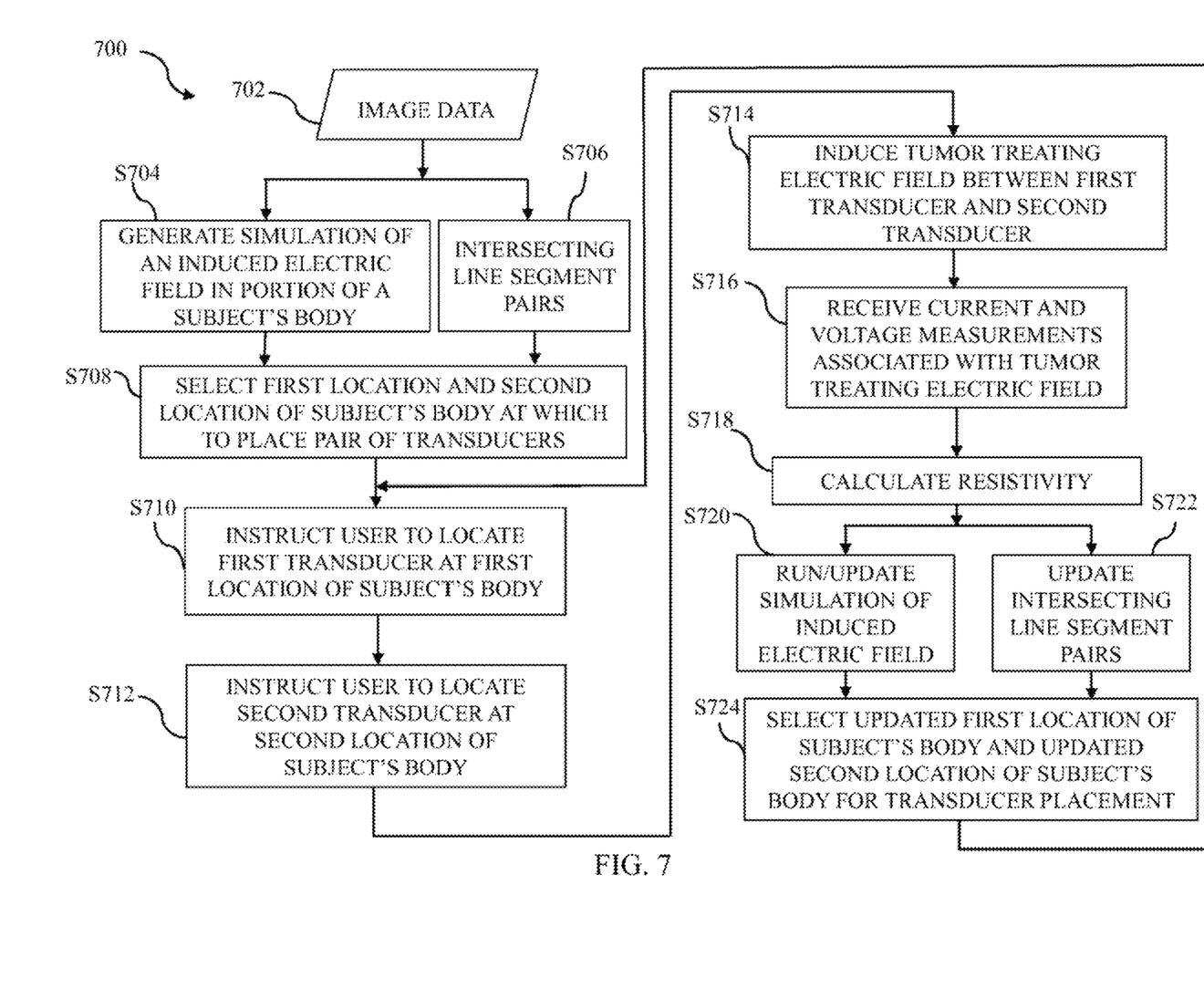
FIG. 7 is a flowchart depicting an example of determining updated transducer layouts.

FIG. 7 depicts a computer-implemented method 700 of determining an updated transducer layout for applying TTFields to a subject's body. The method 700 begins with receiving image data 702 of the subject's body.

The method 700 may include, at step S704, generating a simulation of an induced electric field in a portion of the subject's body based on image data 702. Step S704 may include identifying different types of tissue from the image data 702, assigning conductivities to the different types of tissue, and calculating an expected amount of electric power to be delivered to the tumor from a pair of transducers positioned at a corresponding pair of locations of the subject's body. Based on the image data 702 and an expected voltage output, the simulation generated at step S704 may output an expected amount of electric power to be delivered to the tumor via a pair of transducers located at first and second locations of the subject's body.

The method 700 may include, at step S706, selecting one or more intersecting line segment pairs on an image of the subject's body based on the image data 702. Step S706 may include selecting an intersecting line segment pair that intersects in a region corresponding to the tumor in the image of the subject's body (as discussed with reference to step S112 of FIG. 1).

At step S708, the method 700 may include selecting a first location and a second location of the subject's body at which to place a pair of transducers. This selection (S708) may be conducted in-vitro, i.e., using image data 702 collected prior to applying TTFields.

Step S708 may include selecting the first and second locations based on a prior simulation, for example, by selecting a plurality of pairs of locations at which the transducers may be placed; generating, for each pair of locations, a simulation (step S704) using the same current/voltage inputs; and determining the resulting expected amount of electric power to be delivered to the tumor. Step S708 may include ranking the plurality of pairs of locations according to the expected amount of electric power to be delivered to the tumor, and selecting the pair of locations corresponding to the highest expected amount of electric power.

In another example, step S708 may include selecting the first and second locations based on one or more intersecting line segments pairs (S706), e.g., by selecting a plurality of different intersecting line segment pairs (S706) on an image of the subject's body; and determining a geometry-based "segment pair value" (which is correlated to the LMiPD) for each line segment pair. Determining the segment pair value may include: calculating an absolute value of a difference between a distance between endpoints of the first line segment and a distance between endpoints of the second line segment; or calculating a summation of a distance between endpoints of the first line segment and a distance between endpoints of the second line segment. A weighting factor may be applied in the segment pair value calculation based on tissue types traversed by each line segment. The line segment pairs may be ranked according to segment pair values, and the line segment pair having the segment pair value corresponding to a highest amount of electric power (e.g., highest LMiPD) may be selected. In another example, step S708 may include selecting the first and second locations based on a combination of steps S704/S706.

At steps S710 and S712, the method 700 may include instructing a user (e.g., outputting instructions to an output device) where to locate the first and second transducers with respect to the subject's body. At step S714, the method 700 may include inducing a TTField between at least part of the first transducer and at least part of the second transducer. At step S716, the method 700 includes receiving current and voltage measurements associated with the induced TTField(s) (e.g., as in step S108 of FIG. 1 described above). At step S718, the method may include calculating a resistivity of the subject's body along a path of the TTField between the at least part of the first transducer and at least part of the second transducer based on the received current and voltage measurements (e.g., as in step S110 of FIG. 1 described above).

At step S720, the method 700 may include running at least one simulation of an induced electric field in a portion of the subject's body based on the current and voltage measurements. The calculated resistivity may be input to the simulation(s), or the current and voltage measurements may be input directly to the simulation(s). If a simulation was not previously performed, step S720 may involve identifying types of tissue from image data 702, assigning conductivities to the types of tissue based on the current and voltage measurements, and calculating an expected amount of electric power to be delivered to the tumor from a pair of transducers at corresponding locations. If a simulation (S704) was previously performed, step S720 may comprise updating the prior simulation based on the current/voltage measurements and/or resistivity to identify and correct errors in the prediction of the prior simulation. For example, previous assignments of conductivities to the types of tissue may be updated based on the resistivity feedback. As another example, the received current/voltage measurements of S716 may be substituted for the expected voltage generator output used in S704. A variability of the resistivity of the subject's body with respect to time may be used to adjust the simulation as well, since increased variability in the resistivity may affect stability of the resulting TTFields. A statistical quantity of the resistivity over time, such as an average, minimum, or maximum resistivity value of the subject's body may be used to adjust the simulation.

At step S722, the method may include selecting one or more intersecting line segment pairs (similar to S706, but incorporating the current/voltage measurements in the calculations).

At step S724, the method 700 comprises selecting an updated first location of the subject's body at which to place the first transducer and an updated second location of the subject's body at which to place the second transducer. One or both of the updated locations (S724) may be the same as or different than the prior locations (S708). The updated first and second locations are selected at step S724 based on the feedback of current/voltage measurements collected during the in-vivo application of TTFields to the subject.

The selection at step S724 may be based on at least one simulation of S720. For example, step S724 may involve selecting a plurality of pairs of locations at which the transducers may be placed; generating (or updating), for each pair of locations, a simulation (S720) using the current and voltage inputs; and determining the resulting expected amount of electric power to be delivered to the tumor (i.e., an electrical field intensity distribution value at the tumor) based on the simulations. Step 724 may include ranking the plurality of pairs of locations according to the expected amount of electric power to be delivered to the tumor and selecting the locations having the highest amount of electric power (i.e., the largest electrical field intensity distribution value at the tumor).

In another example, step S724 may include selecting the updated first and second locations based on the intersecting line segment pairs (S722) on an image of the subject's body. The method may include selecting a plurality of different intersecting line segment pairs (S722) on an image of the subject's body and selecting the updated first and second transducer locations (S724) that result in a highest LMiPD delivered to the tumor from the corresponding line segment pair, as calculated based at least in part on one or more resistivities calculated via the current and voltage measurements.

After step S724, the process repeats. The process may iteratively update the simulation (S704 and S720) or intersecting line segment pairs (S706 and S722) based on applied TTFields and the current/voltage measurements. As TTFields are applied, new current/voltage data is integrated into each updated simulation (S720) or as a new calculated LMiPD for an intersecting line segment pair (S722). This iterative process may provide more accurate recommendations than simulations that use assumptions for current/voltage values and/or the conductivities of tissues identified in image data. In addition, updates based on in-vivo data may account for physiological irregularities that are not easily recognizable from image data.

The method 700 may repeat until the updated pair of transducer locations selected in step S724 ceases changing or reaches a threshold level of spatial consistency or stability, and/or until the calculated resistivity value of S718 reaches a threshold. In another example, the method 700 may repeat a set number of times, after which the updated pair of transducer locations that yielded a lowest resistivity value (S718) for the subject may be used for further treatments.

Figure 8:
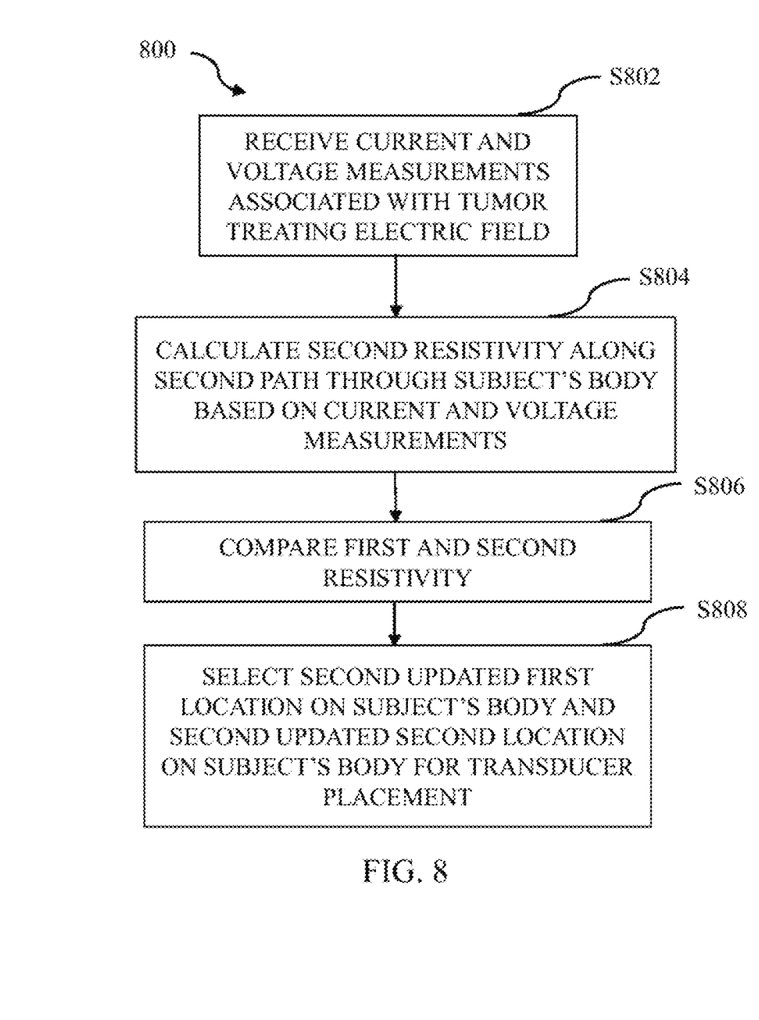
FIG. 8 depicts an example of determining a second updated transducer layout.

FIG. 8 depicts a computer-implemented method 800 of determining an updated transducer layout, which may begin after step S724 of FIG. 7. At step S802, the method 800 may include receiving current/voltage measurements associated with a second TTField induced between at least part of the first transducer located at the updated first location and at least part of the second transducer located at the updated second location. At step S804, a second resistivity along a path extending from the updated first location to the updated second location is calculated based the measurements (S802). At step S806, the first resistivity (S718) and the second resistivity (S804) are compared. At step S808, the method 800 may include selecting a second updated first location on the subject's body at which to place the first transducer and a second updated second location on the subject's body at which to place the second transducer, based on the comparison (step S806) between the first and second resistivities. The second updated pair of transducer locations may be chosen as the pair of transducer locations corresponding to the lowest resistivity (S718 or S804). One or both of the second updated locations (S808) may be the same as or different than the updated locations (S724).

Figure 9:
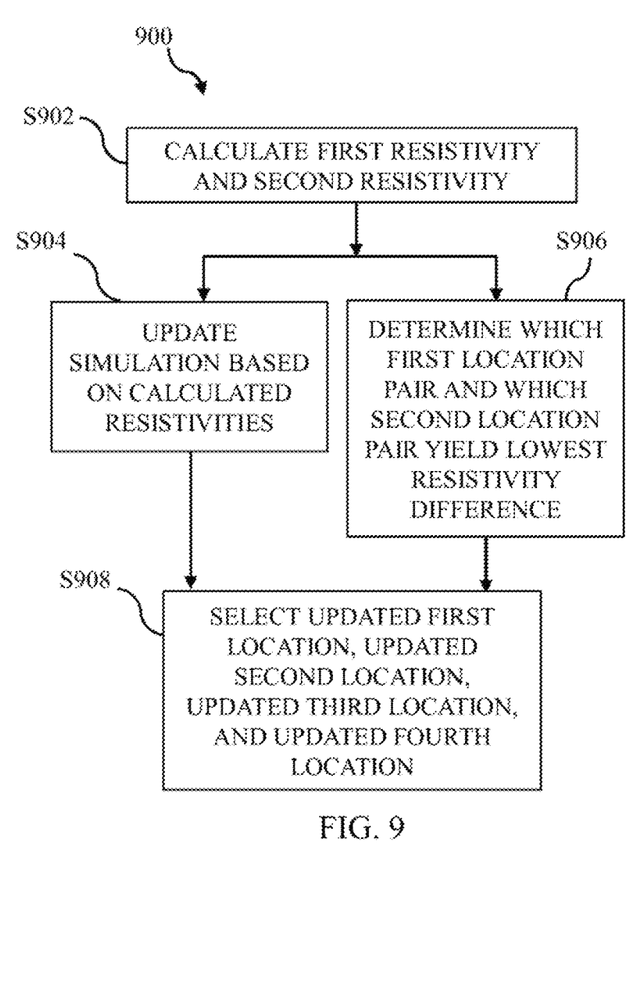
FIG. 9 depicts an example of determining an updated layout for two pairs of transducers to be located on a subject's body.

FIG. 9 depicts an example computer-implemented method 900 of determining an updated four-transducer layout for applying TTFields to a subject's body. Steps of the method 900 may be used to determine where to re-locate the transducers in step S224 of FIG. 2. At step S902, the method 900 may include calculating a first resistivity of the subject's body along a path between first and second transducers, and calculating a second resistivity along a path between third and fourth transducers. Step S902 may include calculating resistivities along the paths of first and second TTFields corresponding to different times during treatment.

At step S904, at least one simulation may be run or updated to incorporate the calculated first resistivity and second resistivity. The simulation may be of an alternating first electric field and second electric field induced in a portion of the subject's body. The calculated resistivities may be substituted for expected resistivities for the AC voltage generator output that was used in prior simulations. The calculated first and second resistivities may be used to correct for directional differences between the TTFields generated through the different channels.

At step S906, the method 900 may include determining, based on the calculated resistivities, which first pair of locations for the first and second transducers and which second pair of locations for the third and fourth transducers yields a lowest resistivity difference between the first and second pairs. A smaller difference between the resistivities may correlate to a larger LMiPD at the tumor. It may be desirable to minimize the difference between the calculated resistivities and/or to minimize the difference between optical path lengths of the intersecting line segment pairs representing paths between the two pairs of transducers.

At step S908, the method 900 includes selecting, based on S904 and/or S906, an updated first location and an updated second location on the subject's body at which to place the first pair of transducers and an updated third location on the subject's body and an updated fourth location on the subject's body at which to place the second pair of transducers.

The invention includes other illustrative embodiments ("Embodiments") as follows.

Embodiment 1: A computer-implemented method of determining locations of transducers on a subject's body for applying tumor treating fields, the method comprising: selecting a plurality of pairs of locations on the subject's body, each pair of locations having a first location to locate a first transducer and a second location to locate a second transducer; obtaining, for each pair of locations, a voltage measurement and a current measurement for an electric field induced between the first transducer and the second transducer, the induced electric field passing through a tumor of the subject's body; calculating, for each pair of locations, a resistivity based on the voltage measurement and the current measurement; selecting and outputting one or more recommended pairs of locations based on the calculated resistivities.

Embodiment 2: The method of Embodiment 1, further comprising: ranking the plurality of pairs of locations based on the calculated resistivities, wherein the one or more recommended pairs of locations are selected based on the ranking.

Embodiment 3: The method of Embodiment 1, wherein selecting and outputting one or more recommended pairs of locations comprises: selecting a first pair of locations having a lowest calculated resistivity; selecting a second pair of locations based on the first pair of locations; outputting the first pair of locations and the second pair of locations.

Embodiment 4: The method of Embodiment 3, wherein an angle between a first line defined by the first pair of locations and a second line defined by the second pair of locations is approximately 90 degrees+/−20 degrees.

Embodiment 5: The method of Embodiment 1, wherein selecting and outputting one or more recommended pairs of locations comprises: selecting a first pair of locations based on the calculated resistivities; selecting a second pair of locations from the remaining one or more pairs of locations, the second pair of locations having a lowest absolute value of a difference in resistivity with regards to the first pair of locations; and outputting the first pair of locations and the second pair of locations.

Embodiment 6: The method of Embodiment 5, wherein selecting the first pair of locations based on the calculated resistivities comprises: selecting a pair of locations having a lowest calculated resistivity as the first pair of locations.

Embodiment 7: The method of Embodiment 1, wherein selecting and outputting one or more recommended pairs of locations comprises: calculating, for a plurality of combinations of two pairs of locations, an absolute value of a difference in resistivity between the two pairs of locations; selecting at least one of the two pairs of locations based on the calculated absolute value of the difference in resistivity; and outputting the selected two pairs of locations.

Embodiment 8: The method of Embodiment 7, wherein one of the pairs of locations of the selected two pairs of locations has a lowest calculated resistivity.

Embodiment 9: The method of Embodiment 1, further comprising: ranking the plurality of pairs of locations based on the calculated resistivities, calculating a power density for each pair of locations, wherein selecting and outputting one or more recommended pairs of locations comprises: selecting a first pair of locations and a second pair of locations based on the ranking and based on the power densities, the first pair of locations and the second pair of locations having a highest local minimum power density (LMiPD); and outputting the selected first pair of locations and the selected second pair of locations.

Embodiment 10: The method of Embodiment 9, wherein an angle between a first line defined by the selected first pair of locations and a second line defined by the selected second pair of locations is approximately 90 degrees+/−20 degrees.

Embodiment 11: The method of Embodiment 1, wherein the first location and the second location of each pair of locations are on a head of the subject's body.

Embodiment 12: The method of Embodiment 1, wherein the first location of each pair of locations is on a head of the subject's body, and the second location of each pair of locations is on a neck of the subject's body.

Embodiment 13: The method of Embodiment 1, wherein the first location and the second location of each pair of locations are on a torso of the subject's body.

Embodiment 14: The method of Embodiment 1, wherein the first location of each pair of locations is on a torso of the subject's body, and the second location of each pair of locations is below the torso of the subject's body.

Embodiment 15: The method of Embodiment 1, wherein for at least two pairs of locations, the first locations of each of the two pairs of locations do not overlap with one another, and the second locations of each of the two pairs of locations do not overlap with one another.

Embodiment 16: The method of Embodiment 1, wherein for at least two pairs of locations, the first locations of each of the two pairs of locations at least partially overlap with one another.

Embodiment 17: The method of Embodiment 1, wherein for at least two pairs of locations, the first locations of each of the two pairs of locations are the same location.

Embodiment 18: The method of Embodiment 1, wherein the first transducer comprises a first array of substantially flat electrode elements, and the second transducer comprises a second array of substantially flat electrode elements.

Embodiment 19: A computer-implemented method for determining locations of transducers on a subject's body for applying tumor treating fields, the method comprising: selecting a plurality of pairs of transducers from a plurality of transducers located on a plurality of locations of the subject's body, each pair of transducers having one first transducer and one second transducer selected from the plurality of transducers; receiving, for each pair of transducers, a voltage measurement and a current measurement for the induced electric field, the induced electric field passing through a tumor of the subject's body; calculating, for each pair of transducers, a resistivity based on the voltage measurement and the current measurement; selecting and outputting one or more recommended pairs of transducers based on the calculated resistivities.

Embodiment 20: The method of Embodiment 19, wherein selecting one or more recommended pairs of transducers comprises selecting a first pair of transducers having a lowest calculated resistivity.

Embodiment 21: The method of Embodiment 19, wherein selecting one or more recommended pairs of transducers further comprises selecting two pairs of transducers having a lowest absolute value of a difference in resistivity.

Embodiment 22: The method of Embodiment 19, wherein the plurality of pairs of transducers are provided in a covering to be worn by the subject.

Embodiment 23: A system to apply tumor treating fields to a subject's body, the system comprising: a plurality of transducers adapted to be located at a plurality of pairs of locations on the subject's body, each pair of locations having a first location to place a first transducer on the subject's body and a second location to place a second transducer on the subject's body; a voltage generator adapted be coupled to at least two of the transducers and capable of inducing an electric field to treat a tumor in the subject's body using the coupled transducers; a controller coupled to the voltage generator, the controller comprising one or more processors and a memory accessible by the one or more processors, the memory storing instructions that when executed by the one or more processors, cause the controller to: instruct the voltage generator to generate voltages to induce electric fields to treat the tumor in the subject's body, each induced electric field corresponding to locations of the transducers on the subject's body; obtain voltages and currents for the induced electric fields; store the voltages and the currents for the induced electric fields in the memory; calculate resistivities based on the recorded voltages and the recorded currents; and store the calculated resistivities in the memory.

Embodiment 24: The system of Embodiment 23, further comprising: a helmet or a garment having the plurality of transducers and adapted to locate the plurality of transducers next to the subject's body, wherein the pairs of locations correspond to locations on the helmet or the garment, wherein the induced electric fields correspond to locations on the helmet or the garment.

Embodiment 25: The system of Embodiment 23, wherein the voltages, the currents, and the calculated resistivities are saved in a log file stored in the memory.

Embodiment 26: An apparatus for determining locations of transducers on a subject's body for applying tumor treating fields, the apparatus comprising: one or more processors; and memory accessible by the one or more processors, the memory storing instructions that when executed by the one or more processors, cause the apparatus to: receive location information corresponding to a plurality pairs of locations on the subject's body, each pair of locations having one first location to locate a first transducer and one second location to locate a second transducer; receive, for each pair of locations, voltage information and current information for an electric field induced between the first transducer and the second transducer, the induced electric field passing through a tumor of the subject's body; calculate, for each pair of locations, a resistivity based on the voltage information and the current information; and select and output one or more recommended pairs of locations based on the calculated resistivities.

Embodiment 27: A computer-implemented method to determine placement of transducers on a subject's body for inducing tumor treating fields in the subject's body, comprising: receiving current and voltage measurements associated with a tumor treating field induced between at least part of a first transducer located at a first location of the subject's body and at least part of a second transducer located at a second location of the subject's body; and selecting, based on the current and voltage measurements, an updated first location of the subject's body at which to place the first transducer and an updated second location of the subject's body at which to place the second transducer.

Embodiment 28: The computer-implemented method of Embodiment 27, further comprising: calculating a resistivity of the subject's body along a path of the tumor treating field between the first transducer and the second transducer based on the current and voltage measurements, wherein the updated first location and updated second location are selected based on the calculated resistivity.

Embodiment 29: The computer-implemented method of Embodiment 27, further comprising selecting the first location of the subject's body and the second location of the subject's body based on a simulation of an induced electric field in the portion of the subject's body.

Embodiment 30: The computer-implemented method of Embodiment 27, further comprising selecting the first location of the subject's body and the second location of the subject's body based on one or more intersecting line segments pairs on an image of the subject's body.

Embodiment 31: The computer-implemented method of Embodiment 27, further comprising: running at least one simulation of an induced electric field in a portion of the subject's body based on the current and voltage measurements, wherein the updated first location and updated second location are selected based on the at least one simulation.

Embodiment 32: The computer-implemented method of Embodiment 31, wherein running at least one simulation comprises: running multiple simulations of induced electric fields in the portion of the subject's body, the multiple simulations corresponding to electric fields induced between transducers located at multiple pairs of locations of the subject's body; wherein selecting the updated first location and the updated second location comprises: ranking the multiple pairs of locations according to electrical field intensity distribution values at a tumor site in the subject's body determined based on the multiple simulations; and selecting the pair of locations on the subject's body yielding a largest electrical field intensity distribution value at the tumor site as the updated first location and the updated second location.

Embodiment 33: The computer-implemented method of Embodiment 27, wherein the updated first location and updated second location are selected based on one or more intersecting line segments pairs on an image of the subject's body and one or more resistivities calculated based on the current and voltage measurements.

Embodiment 34: The computer-implemented method of Embodiment 27, wherein: the current and voltage measurements are recorded in a log file of a computer communicatively coupled to a device capable of determining the current and voltage measurements.

Embodiment 35: The computer-implemented method of Embodiment 34, wherein the computer runs at least one simulation.

Embodiment 36: The computer-implemented method of Embodiment 34, wherein the tumor treating field is induced between the first transducer and the second transducer using power supplied via a voltage generator, wherein the computer is disposed proximate the voltage generator.

Embodiment 37: The computer-implemented method of Embodiment 27, comprising: receiving current and voltage measurements associated with a second tumor treating field induced between the first transducer located at the updated first location of the subject's body and the second transducer located at the updated second location of the subject's body; and selecting, based on the current and voltage measurements associated with both the tumor treating field and the second tumor treating field, a second updated first location on the subject's body at which to place the first transducer and a second updated second location on the subject's body at which to place the second transducer.

Embodiment 38: The computer-implemented method of Embodiment 37, further comprising: calculating a first resistivity along a first path through the subject's body based on the current and voltage measurements associated with the tumor treating electric field; calculating a second resistivity along a second path through the subject's body based on the current and voltage measurements associated with the second tumor treating electric field; and selecting the second updated first location on the subject's body and the second updated second location on the subject's body based on a comparison between the first resistivity and the second resistivity.

Embodiment 39: The computer-implemented method of Embodiment 27, wherein the updated first location is the same as the first location, the updated second location is the same as the second location, or the updated first and second locations are the same as the first and second locations.

Embodiment 40: The computer-implemented method of Embodiment 27, wherein the first and second transducers comprise arrays of substantially flat electrode elements.

Embodiment 41: The computer-implemented method of Embodiment 27, wherein the first transducer and the second transducer are affixed to the subject's body.

Embodiment 42: The computer-implemented method of Embodiment 27, wherein the first transducer is integrated in a garment to cover the first location, and the second transducer is integrated in a garment to cover the second location.

Embodiment 43: The computer-implemented method of Embodiment 27, wherein the first location of the first transducer and the second location of the second transducer are on a head of the subject's body.

Embodiment 44: The computer-implemented method of Embodiment 27, wherein the first location of the first transducer and the second location of the second transducer are on a torso of the subject's body.

Embodiment 45: A computer-implemented method to determine placement of transducers on a subject's body for inducing tumor treating fields in the subject's body, the computer comprising one or more processors and memory accessible by the one or more processors, the memory storing instructions that when executed by the one or more processors cause the computer to perform the method, the method comprising: selecting a first location on the subject's body and a second location on the subject's body at which to place a pair of transducers; receiving actual current and voltage measurements associated with an electric field induced between a first transducer located at the selected first location on the subject's body and a second transducer located at the selected second location on the subject's body, the induced electric field applied between the pair of transducers and passing through a tumor in the subject's body; and selecting, based on the actual current and voltage measurements, an updated first location on the subject's body and an updated second location on the subject's body at which to place the pair of transducers.

Embodiment 46: The computer-implemented method of Embodiment 45, further comprising: calculating a resistivity of the subject's body along a path between the first transducer and the second transducer based on the received actual current and voltage measurements, wherein the updated first location and updated second location are selected based on the calculated resistivity.

Embodiment 47: The computer-implemented method of Embodiment 45, further comprising: generating at least one simulation of an induced electric field in a portion of the subject's body, the induced electric field applied between a pair of transducers and passing through a tumor in the subject's body, wherein the first location and the second location are selected based on the at least one simulation; and updating the at least one simulation of the induced electric field in the portion of the subject's body based on the actual current and voltage measurements, wherein the updated first location and the updated second location are selected based on the at least one updated simulation.

Embodiment 48: The computer-implemented method of Embodiment 47, wherein updating the at least one simulation comprises: generating multiple simulations of induced electric fields in the portion of the subject's body based on the actual current and voltage measurements, the multiple simulations corresponding to electric fields induced between transducers located at multiple pairs of locations on the subject's body; and calculating an electrical field intensity distribution value at the tumor for the transducers located at each of the multiple pairs of locations on the subject's body; wherein selecting the updated first location and the updated second location comprises: ranking the multiple pairs of locations according to the electrical field intensity distribution values; and selecting the pair of locations on the subject's body yielding a largest electrical field intensity distribution value at the tumor site as the updated first location and the updated second location.

Embodiment 49: The computer-implemented method of Embodiment 47, further comprising generating the at least one simulation based on one or more sets of image data corresponding to the portion of the subject's body.

Embodiment 50: The computer-implemented method of Embodiment 47, wherein the updated first location and the first location are the same, the updated second location and the second location are the same, or the updated first and second locations are the same as the first and second locations.

Embodiment 51: A non-transitory computer-readable medium comprising instructions to identify locations to locate transducers on a subject's body for inducing tumor treating fields, the instructions when executed by a computer cause the computer to perform a method comprising: selecting a first location on the subject's body and a second location on the subject's body at which to locate a pair of transducers; receiving actual current and voltage measurements associated with an electric field induced between a first transducer located at the selected first location on the subject's body and a second transducer located at the selected second location on the subject's body, the electric field passing through a tumor in the subject's body; selecting, based on the actual current and voltage measurements, an updated first location on the subject's body and an updated second location on the subject's body at which to place the transducers; and outputting the updated first location and the updated second location to locate the transducers on the subject's body.

Embodiment 52: A computer-implemented method to determine placement of transducers on a subject's body for inducing tumor treating fields, the computer comprising one or more processors and memory accessible by the one or more processors, the memory storing instructions that when executed by the one or more processors cause the computer to perform the method, the method comprising: selecting a first location and a second location on a subject's body at which to place a first pair of transducers; selecting a third location and a fourth location on the subject's body at which to place a second pair of transducers; receiving actual current and voltage measurements associated with a first electric field induced between the first pair of transducers located at the selected first and second locations on the subject's body, the first electric field applied between the first pair of transducers and passing through a tumor in the subject's body; receiving actual current and voltage measurements associated with a second electric field induced between the second pair of transducers located at the selected third and fourth locations on the subject's body, the second electric field applied between the second pair of transducers and passing through the tumor in the subject's body; calculating a first resistivity of the subject's body along a path between the first and second transducers based on the actual current and voltage measurements associated with the first electric field; calculating a second resistivity of the subject's body along a path between the third and fourth transducers based on the actual current and voltage measurements associated with the second electric field; and selecting, based on the calculated first resistivity and second resistivity, an updated first location on the subject's body and an updated second location on the subject's body at which to place the first pair of transducers and an updated third location on the subject's body and an updated fourth location on the subject's body at which to place the second pair of transducers.

Embodiment 53: The computer-implemented method of Embodiment 52, wherein selecting the updated first, second, third, and fourth locations on the subject's body comprises determining which first pair of a plurality of first pairs of locations for the first and second transducers and which second pair of a plurality of second pairs of locations for the third and fourth transducers yields a lowest resistivity difference between the first and second pairs.

Embodiment 54: The computer-implemented method of Embodiment 52, further comprising: generating at least one simulation of an alternating first electric field and second electric field induced in a portion of a subject's body, wherein the first, second, third, and fourth locations on the subject's body are selected based on the at least one simulation; and updating the at least one simulation to include the calculated first resistivity and second resistivity, wherein the updated first, second, third, and fourth locations are selected based on the at least one updated simulation.

Modifications, alterations, and changes to the described embodiments are possible without departing from the scope of the present invention defined in the claims. The present invention has the full scope defined by the language of the claims, and equivalents thereof

What is claimed is:

1. A computer-implemented method of determining locations of transducers on a subject's body for applying tumor treating fields, the method comprising:
   selecting, using one or more computer processors, a plurality of pairs of locations on the subject's body, each pair of locations having a first location to locate a first transducer and a second location to locate a second transducer;
   receiving, using the one or more computer processors, for each pair of locations, a voltage measurement and a current measurement for an electric field induced between the first transducer and the second transducer, the induced electric field passing through a tumor of the subject's body;
   calculating, using the one or more computer processors, for each pair of locations, a resistivity based on the voltage measurement and the current measurement;

ranking, using the one or more computer processors, the plurality of pairs of locations based on the calculated resistivities; and selecting and outputting, using the one or more computer processors, one or more recommended pairs of locations based on the calculated resistivities, wherein the one or more recommended pairs of locations are selected based on the ranking.

2. The method of claim 1, wherein selecting and outputting one or more recommended pairs of locations comprises:
   selecting a first pair of locations having a lowest calculated resistivity;
   selecting a second pair of locations based on the first pair of locations;
   outputting the first pair of locations and the second pair of locations.

3. The method of claim 2, wherein an angle between a first line defined by the first pair of locations and a second line defined by the second pair of locations is approximately 90 degrees+/−20 degrees.

4. The method of claim 1, wherein selecting and outputting one or more recommended pairs of locations comprises:
   selecting a first recommended pair of locations based on the calculated resistivities;
   selecting a second recommended pair of locations from the remaining one or more pairs of locations, the second recommended pair of locations having a lowest absolute value of a difference in resistivity with regards to the first pair of locations and the remaining one or more pairs of locations; and
   outputting the first recommended pair of locations and the second recommended pair of locations.

5. The method of claim 1, wherein selecting and outputting one or more recommended pairs of locations comprises:
   calculating, for a plurality of combinations of two pairs of locations, an absolute value of a difference in resistivity between the two pairs of locations;
   selecting at least one of the two pairs of locations based on the calculated absolute value of the difference in resistivity; and
   outputting the selected at least one of the two pairs of locations.

6. The method of claim 1, further comprising:
   calculating a power density for each pair of locations,
   wherein selecting and outputting one or more recommended pairs of locations comprises:
     selecting a first pair of locations and a second pair of locations based on the ranking and based on the power densities, the first pair of locations and the second pair of locations having a highest local minimum power density (LMiPD); and
     outputting the selected first pair of locations and the selected second pair of locations.

7. The method of claim 1, wherein for at least two pairs of locations, the first locations of each of the two pairs of locations at least partially overlap with one another.

8. The method of claim 1, wherein the voltage measurement and the current measurement are received from stored data.

9. The method of claim 1, wherein ranking the plurality of pairs of locations is further based on a calculated amount of electric power to be delivered to the subject's body.

10. The method of claim 1, wherein the one or more recommended pairs of locations comprises a location on a head, neck, or torso of the subject's body.

11. An apparatus for determining locations of transducers on a subject's body for applying tumor treating fields, the apparatus comprising: one or more processors; and memory accessible by the one or more processors, the memory storing instructions that when executed by the one or more processors, cause the apparatus to a method comprising:
   selecting, using the one or more computer processors, a plurality of pairs of locations on the subject's body, each pair of locations having a first location to locate a first transducer and a second location to locate a second transducer;
   receiving, using the one or more computer processors, for each pair of locations, a voltage measurement and a current measurement for an electric field induced between the first transducer and the second transducer, the induced electric field passing through a tumor of the subject's body;
   calculating, using the one or more computer processors, for each pair of locations, a resistivity based on the voltage measurement and the current measurement;
   ranking, using the one or more computer processors, the plurality of pairs of locations based on the calculated resistivities; and
   selecting and outputting, using the one or more computer processors, one or more recommended pairs of locations based on the calculated resistivities, wherein the one or more recommended pairs of locations are selected based on the ranking.

12. A non-transitory computer-readable medium comprising instructions for determining locations of transducers on a subject's body for applying tumor treating fields, the instructions when executed by a computer cause the computer to perform a method comprising:
   selecting, using one or more computer processors, a plurality of pairs of locations on the subject's body, each pair of locations having a first location to locate a first transducer and a second location to locate a second transducer;
   receiving, using one or more computer processors, for each pair of locations, a voltage measurement and a current measurement for an electric field induced between the first transducer and the second transducer, the induced electric field passing through a tumor of the subject's body;
   calculating, using the one or more computer processors, for each pair of locations, a resistivity based on the voltage measurement and the current measurement;
   ranking, using the one or more computer processors, the plurality of pairs of locations based on the calculated resistivities; and
   selecting and outputting, using the one or more computer processors, one or more recommended pairs of locations based on the calculated resistivities, wherein the one or more recommended pairs of locations are selected based on the ranking.

* * * * *